(12) United States Patent
Kincaid et al.

(10) Patent No.: US 11,976,006 B2
(45) Date of Patent: May 7, 2024

(54) LOW SHRINKAGE, FAST DRYING SPACKLING OR JOINT COMPOUND

(71) Applicant: KNAUF GIPS KG, Iphofen (DE)

(72) Inventors: Tyler Kincaid, Chicago, IL (US); Rafael Bury, Wheeling, IL (US)

(73) Assignee: KNAUF GIPS KG, Iphofen (DE)

( * ) Notice: Subject to any disclaimer, the term of this patent is extended or adjusted under 35 U.S.C. 154(b) by 15 days.

(21) Appl. No.: 17/157,049

(22) Filed: Jan. 25, 2021

(65) Prior Publication Data

US 2021/0276917 A1 Sep. 9, 2021

Related U.S. Application Data

(60) Provisional application No. 62/986,353, filed on Mar. 6, 2020.

(51) Int. Cl.

| | | |
|---|---|---|
| C04B 14/10 | (2006.01) | |
| C04B 14/24 | (2006.01) | |
| C04B 14/28 | (2006.01) | |
| C04B 16/02 | (2006.01) | |
| C04B 26/06 | (2006.01) | |
| C04B 40/00 | (2006.01) | |
| C04B 26/28 | (2006.01) | |
| C04B 103/00 | (2006.01) | |
| C04B 103/44 | (2006.01) | |
| C04B 111/00 | (2006.01) | |
| C04B 111/72 | (2006.01) | |

(52) U.S. Cl.
CPC ............. *C04B 14/28* (2013.01); *C04B 14/10* (2013.01); *C04B 14/24* (2013.01); *C04B 16/02* (2013.01); *C04B 26/06* (2013.01); *C04B 40/0039* (2013.01); *C04B 26/28* (2013.01); *C04B 2103/0079* (2013.01); *C04B 2103/44* (2013.01); *C04B 2111/00327* (2013.01); *C04B 2111/00482* (2013.01); *C04B 2111/00681* (2013.01); *C04B 2111/72* (2013.01)

(58) Field of Classification Search
CPC ......... C04B 14/28; C04B 14/10; C04B 14/24; C04B 16/02; C04B 40/0039; C04B 2103/0079; C04B 2103/44; C04B 2111/00327; C04B 2111/00482; C04B 2111/00681; C04B 2111/72; C04B 26/04; C04B 26/06; C04B 26/28; C04B 40/00; C04B 14/102; C04B 14/104; C04B 14/106; C04B 20/0048; C04B 24/02; C04B 24/2641; C04B 24/2664; C04B 24/383; C04B 2103/0094; C04B 2103/40; C04B 2103/50; C04B 2103/54; C04B 2103/67; C04B 2103/04; C09K 3/10; E04F 13/04; E04F 13/02
USPC ...................... 106/781, 778, 783
See application file for complete search history.

(56) References Cited

U.S. PATENT DOCUMENTS

| | | | |
|---|---|---|---|
| 2,678,280 A | 5/1954 | Noyes et al. | |
| 3,365,315 A | 1/1968 | Beck et al. | |
| 4,391,646 A | 7/1983 | Howel | |
| 4,629,751 A | 12/1986 | Montgomery | |
| 5,653,797 A * | 8/1997 | Patel | C04B 28/14 106/781 |
| 6,531,528 B1 | 3/2003 | Kurp | |
| 6,790,277 B2 | 9/2004 | Ayambem | |
| 6,894,095 B2 | 5/2005 | Russo et al. | |
| 7,790,796 B2 | 9/2010 | Foster et al. | |
| 7,981,962 B1 | 7/2011 | Schad et al. | |
| 8,772,389 B1 | 7/2014 | Brandon et al. | |
| 8,931,230 B2 | 1/2015 | Negri et al. | |
| 9,006,302 B2 | 4/2015 | Amos et al. | |
| 9,068,058 B2 | 6/2015 | Patel et al. | |
| 9,169,426 B2 | 10/2015 | Negri et al. | |
| 2002/0038618 A1* | 4/2002 | Ayambem | C04B 28/14 106/793 |
| 2002/0129744 A1* | 9/2002 | Immordino, Jr. | C04B 28/14 106/778 |
| 2005/0229519 A1 | 10/2005 | Colbert et al. | |
| 2006/0096074 A1 | 5/2006 | Foster et al. | |
| 2007/0100035 A1 | 5/2007 | Rosekelly et al. | |
| 2012/0316260 A1 | 12/2012 | Kukreja et al. | |
| 2013/0225732 A1 | 8/2013 | Bakeev et al. | |
| 2014/0083038 A1* | 3/2014 | Negri | C08L 67/08 524/375 |
| 2015/0176267 A1 | 6/2015 | Casimiro et al. | |
| 2017/0233293 A1 | 8/2017 | Ayambem | |

FOREIGN PATENT DOCUMENTS

| | | |
|---|---|---|
| EP | 2452987 A1 | 5/2012 |
| EP | 2038235 B1 | 4/2016 |
| WO | WO0034200 A1 | 6/2000 |
| WO | WO 03040243 A1 | 5/2003 |
| WO | WO2009087046 A1 | 7/2009 |
| WO | WO2012107254 A1 | 8/2012 |
| WO | WO 2013109576 A1 | 7/2013 |

OTHER PUBLICATIONS

Lenntech (Molecular Weight Calculator) [retrieved from the internet at Jul. 10, 2023 from <URL:https://www.lenntech.com/calculators/molecular/molecular-weight-calculator.htm>]. (Year: 2019).*
DryDex Spackling—DAP, "AP DryDEX Splacking", Oct. 22, 2019, https://www.dap.com/dap-products-ph/drydex-spackling/, pp. 1-10.
Dillinger et al., "Crush Strength Analysis of Hollow Glass Microspheres", Masters of Science in Materials Science and Engineering, Oct. 10, 2016, pp. 1-110.

* cited by examiner

*Primary Examiner* — Anthony J Green
*Assistant Examiner* — Marites A Guino-O Uzzle
(74) *Attorney, Agent, or Firm* — Greer, Burns & Crain, Ltd

(57) ABSTRACT

Spackling and joint compounds with lower shrinkage, better sanding, and fast drying. Methods for repairing walls and ceiling in which the present spackling compound is applied to a variety of substrates, including wallboard, plaster and/or wood. Methods for finishing seams in wall construction in which the spackling/joint compound is used for finishing the seams.

16 Claims, 9 Drawing Sheets

Table 2.

| Product | Fast Finish Compound | Premium Spackle | Lightweight Spackle | Conventional Spackle | Lightweight Joint Compound |
|---|---|---|---|---|---|
| Density (lbs/gal) | 7.85 | 6.35 | 3.70 | 15.00 | 10.00 |
| Shrinkage | 16% | 9% | 10% | 18% | 22% |
| Drying Rate (75°F/50% RH) | | | | | |
| 1-hour | 24% | 47% | 37% | 18% | 21% |
| 2-hour | 44% | 80% | 68% | 35% | 38% |
| 4-hour | 87% | 100% | 92% | 65% | 73% |
| 6-hour | 100% | 100% | 96% | 89% | 98% |
| 8-hour | 100% | 100% | 98% | 97% | 100% |
| Sanding Hardness (% material removed) | 10% | 36% | 3% | 4% | 25% |
| Workability | 12 | 22 | 9.5 | 16 | 32 |
| Paintability-Gloss (R85°) | 18 | 12 | 13 | 28 | 7 |

Fig. 5

LOW SHRINKAGE, FAST DRYING SPACKLING OR JOINT COMPOUND

CROSS-REFERENCE TO RELATED APPLICATIONS

This application claims the benefit of priority from U.S. Provisional Patent Application 62/986,353 filed Mar. 6, 2020, the entire disclosure of which is incorporated herein by reference in its entirety.

TECHNICAL FIELD

The present disclosure relates to lightweight spackling compounds and joint compounds with a shortened drying time and ultra-low shrinkage. The compounds can be used for finishing wallboard joints or for repairing a damaged area in wallboard, plaster, cementitious substrate or wood.

BACKGROUND

Gypsum wallboards which can be also referred to as drywall are commonly used in construction of walls and ceilings in commercial and residential buildings. Often, a wall is assembled by attaching wallboards one by one to a supporting frame. A seam between two adjacent attached wallboards or other gypsum panels is called a joint. In order to strengthen the wall assembly and create a wall with monolithic and even surface without gaps, the joints are filled with an adhesive compound, called a joint compound. Finishing a seam (joint) may require several coats of a joint compound, depending on a shrinkage rate of the joint compound. After the applied joint compound dries, it is often sanded before the wall can be coated with a primer and/or painted and/or decorated.

Examples of wall assemblies and joint compounds known in the art include those provided in U.S. Pat. Nos. 8,931,230 and 9,169,426, the entire disclosures of which are incorporated herein by reference.

A wallboard wall may sustain some minor damage, such for example as cracks, dents or nail holes. Spackling compounds, which may be referred to as repair compounds, are typically used in order to fill in and repair various surface damage in wallboard, plaster, cementitious substrate or wood. Examples of spackling compounds known in the art include those disclosed in U.S. Pat. No. 4,629,751, PCT Publication WO 03/040243, U.S. Pat. Nos. 6,531,528, 7,790,796 and PCT Publication WO 2013/109576.

When a spackling compound dries as a repair patch on the wall surface, the repair patch may shrink significantly. This shrinkage is highly undesirable as it prevents from creating an even wall surface, requiring multiple coats to level the surface. It is also important for the repair path to be easily sandable in order to further blend the patch with the rest of the wall and prepare the wall surface for a coat of paint. Furthermore, before the repair patch can be sanded, the spackling compound must dry sufficiently. Accordingly, there is also a need in the art for spackling compounds which are fast drying.

Various conventional spackling compounds address at least some of these needs. Accordingly, there still exists the need in the field for a spackling compound that would address various needs simultaneously.

SUMMARY

In one aspect, the present disclosure provides a spackling compound characterized by low shrinkage, improved sandability, a shorter drying time, and excellent workability.

In one embodiment, this disclosure provides a spackling compound which comprises calcium carbonate, hollow glass microspheres, a binder, a humectant, a polyacid dispersant and a rheology-modifying additive. In the present spackling compounds, the rheology-modifying additive may comprise one or more of the following: a rheology-modifying clay, a cellulosic thickener, an associative thickener, a non-associative synthetic thickener, an oil-based thixotrope, or any combination thereof. In some embodiments of the spackling compound, the rheology-modifying additive may include a rheology-modifying clay and a cellulosic thickener. Some preferred spackling compounds may comprise 20-50% w/w calcium carbonate, 2-40% w/w hollow glass microspheres, 0.1-20% w/w of the rheology-modifying clay, 0.1-5% w/w of the cellulosic thickener, 0.5-20% w/w of the binder, 0.1-5% w/w of the humectant, 0.1-3% w/w of the polyacid dispersant and 20-50% w/w water.

In the spackling compounds of this disclosure, calcium carbonate can be sourced as dolomitic limestone. Some of the spackling compounds of this disclosure are dry powders, while some other spackling compounds are a paste and comprise water. The paste spackling compounds include a ready-mixed spackling compound. In some embodiments, the spackling compounds may comprise calcium carbonate in an amount from 20% w/w to 50% w/w by weight of the spackling compound total, including water.

In some embodiments, the spackling compound is a paste which comprises water in an amount from 20% w/w to 50% w/w by weight of the spackling compound total, including water.

The present spackling compounds may comprise hollow glass microspheres which are a mixture of particles with a particle size distribution with a particle median size by volume in the range from 40 to 70 microns. The present spackling compounds may comprise hollow glass microspheres which are a mixture of particles having a minimum true density of at least 0.1 g/cc.

In some embodiments, the present spackling compounds may comprise the hollow glass microspheres in an amount in the range from 2% w/w to 40% w/w by weight of the spackling compound total, including water.

Some of the spackling compounds according to this disclosure may comprise one or more of the following rheology-modifying clays: kaolinite, attapulgite, bentonite, illite, sepiolite or any combination thereof.

In some embodiments, some of the spackling compounds comprise a rheology-modifying clay in an amount from 5% w/w to 20% w/w by weight of the spackling compound total, including water.

In some embodiments, some of the spackling compounds comprise a cellulosic thickener which comprises one or more of the following: methyl cellulose, methyl hydroxyethyl cellulose, hydroxyethyl cellulose, hydroxypropyl methyl cellulose, hydroxypropyl cellulose, or any mixture thereof.

In some embodiments, some of the spackling compounds comprise a cellulosic thickener in an amount in the range from 0.1% w/w to 5% w/w by weight of the spackling compound total, including water.

Some of the spackling compounds according to this disclosure may comprise one or more of the following rheological thickeners: a hydrophobically modified polyurethane (HEUR), a hydrophobically modified polyether (HMPE), a styrene-maleic anhydride terpolymer (SMAT), a hydrophobically modified alkali swellable acrylic emulsion (HASE), hydrophobically modified ethoxylated aminoplast polymer (HEAT), an alkali swellable acrylic emulsion (ASE), an oil-based thixotrope, or any combination thereof. Any of these rheological thickeners can be used instead of or in addition to one or more of the cellulosic thickeners and/or instead of or in addition to the rheology-modifying clays.

All present spackling compounds of this disclosure comprise one or more binders. In certain embodiments, the spackling compounds may comprise from 0.5% w/w to 10% w/w of the binder, wherein the amount is calculated from weight of the spackling compound total, including water. The preferred binders include, but are not limited to, starch, a polymeric binder, or any combination thereof. Particularly preferred binders may include starch, polyvinyl alcohol, acrylic binder, styrene-acrylic binder, vinyl acrylic binder, or any combination thereof.

The present spackling compounds comprise one or more humectants which may comprise one or more of the following: glycerol, ethylene glycol, diethylene glycol, triethylene glycol, propylene glycol, di-propylene glycol, and/or tri-propylene glycol, or any combination thereof.

The spackling compounds comprise one or more polyacid dispersants which may include in some embodiments a homopolymer or co-polymer of acrylic, methacrylic, crotonic and/or maleic acids and has a molecular weight in the range from 1,500 to 20,000 Daltons.

Some of the spackling compounds of this disclosure may comprise one or more of the following: a pigment, a biocide/preservative, a defoamer, a surfactant, fibers, a dryness indicator, a pH adjuster/stabilizer, and/or any combination thereof.

In further aspect, the present disclosure provides a method for patching a surface, the method comprising applying to the surface one or more of the spackling compounds provided in this disclosure. The surface may be wallboard, plaster, cementitious substrate and/or wood. The patched surface may be further sanded, coated with a primer and/or painted, if needed.

In yet another aspect, the present disclosure provides a method for finishing a joint between two adjacent panels, wherein the method comprises filling the joint with one or more of the spackling compound of this disclosure and/or applying one or more of the spackling compounds as a top-coat.

BRIEF DESCRIPTION OF THE DRAWINGS

FIG. 5 reports a comparative analysis of the inventive spackling compound in comparison to conventional spackling compounds and joint compounds.

DETAILED DESCRIPTION

Figure 1:
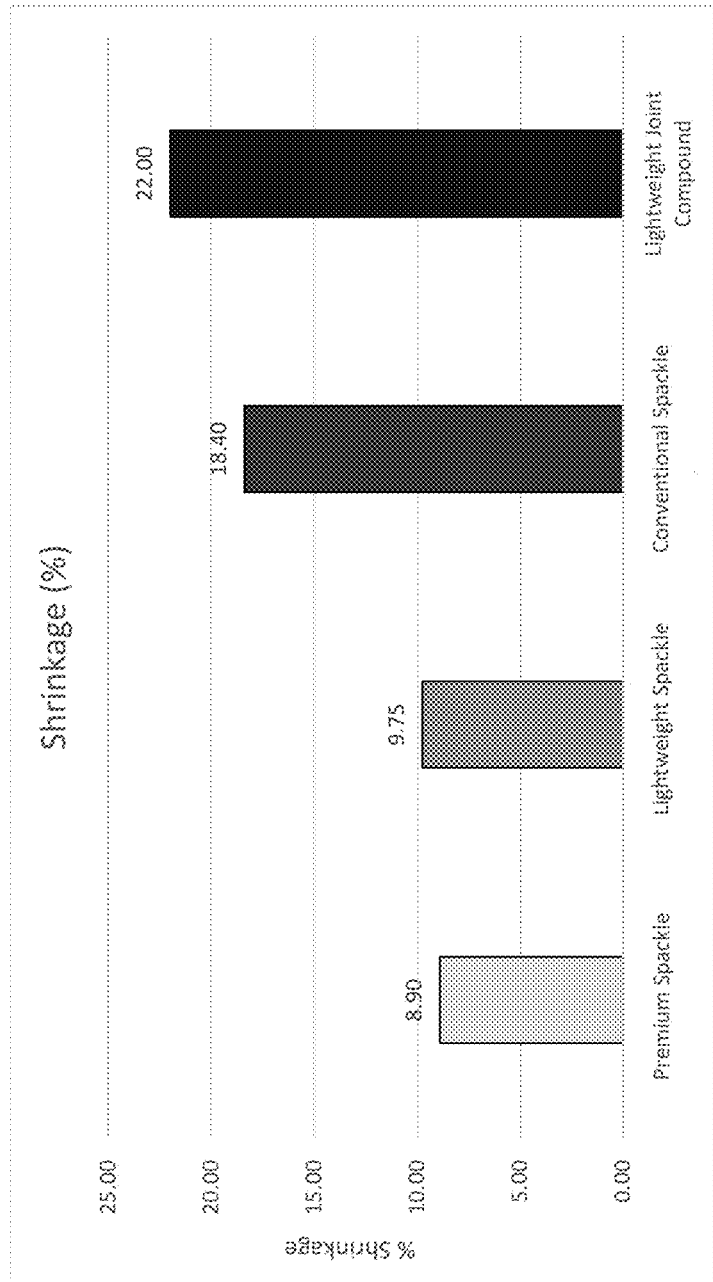
FIG. 1 reports a comparative analysis from shrinkage tests.

The present disclosure relates to an inventive spackling compound that addresses various shortcomings of current conventional spackling and joint compounds. The inventive spackling compound is characterized by low shrinkage, improved sandability, a shorter drying time, and excellent workability. The inventive spackling compound performs better than conventional formulations in various tests. These technically advantageous features are achieved by formulating the inventive spackling compound with a combination of several ingredients as described below.

This unique combination of the improved features is attributed to the composition of the present spackling compounds. In some embodiments, the present spackling compounds may comprise calcium carbonate, hollow glass microspheres, one or more binders, one or more humectants, a polyacid dispersant, and one or more of rheology-modifying additives. The present spackling compounds can be prepared in dry-power form which is mixed with water by a user or as a ready-mixed paste which is premixed with water and stored as a ready-to-use paste.

In some embodiments, the present inventive spackling compound according to this disclosure comprises a combination of calcium carbonate, hollow glass microspheres and a rheology-modifying clay. In some conventional spackling compounds, including those disclosed in WO 2013/109576, hollow glass microspheres are used as an alternative to calcium carbonate.

Despite these conventional formulations, certain embodiments of the present inventive spackling compound comprise a combination of hollow glass microspheres, calcium carbonate and at least one rheological modifier which can be synthetic or natural clay. Furthermore, the inventors have determined that hollow glass microspheres and calcium carbonate are two additives which complement each other's properties, producing a combination with a certain synergistic effect.

In the present spackling compounds, calcium carbonate can be sourced as calcite or limestone, including dolomitic limestone. Calcium carbonate can be ground. In some embodiments of the present spackling compound, calcium carbonate can be used in an amount in the range from 20% w/w to 50% w/w by weight of the spackling compound total, including water. Some spackling compounds according to this disclosure may comprise calcium carbonate in any amount in the range from about 25% w/w to about 45% w/w, or from about 30% w/w to about 40% w/w by weight of the spackling compound as formulated with water.

The spackling compounds in the present disclosure are used as a paste formulated with water. The spackling compounds of this disclosure can be prepared as dry powder which a user mixes with water just prior to use. In some embodiments, the spackling compounds can be manufactured and stored as a ready-mixed paste.

Various amounts of water can be used in order to prepare a spackling paste. Typically, the present spackling compound pastes comprise water in an amount from 20% w/w to 50% w/w by weight of the spackling compound total, including water.

The final paste formulation of the spackling compound according to this disclosure contains water. In the present disclosure and unless stated specifically, all percentages are by weight from the total weight of the spackling compound as formulated, including water. In the present disclosure, "a percentage by weight from the total weight of the spackling compound as formulated, including water" can be abbreviated as % w/w. For example, if 100 g of the formulated (includes water, paste consistency and ready for application to a wall surface) spackling compound is prepared with calcium carbonate in the amount 10% w/w, this 100 g of the spackling compound contains 10 g of calcium carbonate which can be limestone, e.g. dolomitic limestone.

The present spackling compounds comprise hollow glass microspheres which can interchangeably be referred to in this disclosure as glass bubbles or glass beads. Suitable hollow microspheres can be made from lime borosilicate, recycled glass and/or expanded glass. Suitable hollow glass microspheres can be produced by methods disclosed in U.S. Pat. Nos. 3,365,315 and 4,391,646.

Suitable hollow glass microspheres are available from 3M Company, St. Paul, MN, under the trade name 3M™ glass bubbles which are soda-lime-borosilicate hollow glass microspheres. Suitable hollow glass microspheres are also available from Omega Minerals under the Omega-Bubbles™ trade name.

Some spackling compounds can be formulated with hollow glass microspheres which are a mixture of hollow glass microspheres of different sizes. Particle sizes in a mixture can range from 10 microns to 120 microns. Preferred hollow glass microspheres include mixtures with a particle median size by volume in the range from 40 to 100 microns, or from 40 to 70 microns, and more preferably in the range from 55 to 65 microns. The most preferred hollow glass microspheres include mixtures of particles with the median size by volume in the range from 60 to 65 microns, e.g. the median size by volume of 60, 61, 62, 63, 64 or 65 microns.

The median size can be also referred in this disclosure as the D50 size. The term "particle size" for hollow glass microspheres is an equivalent with the diameter and height of the hollow glass microspheres. The median size by volume is determined by laser light diffraction, following the method described in U.S. Pat. No. 9,006,302.

Preferred hollow glass microspheres of this disclosure are mixtures of hollow glass microspheres having a minimum true density of at least 0.1 g/cc, at least 0.15 g/cc, at least 0.2 g/cc, at least 0.3 g/cc or at least 0.4 g/cc, as measured by using a pycnometer in accordance with ASTM D2840-69. Preferred hollow glass microspheres of this disclosure may also include a mixture of hollow glass microspheres with a minimum true density of at least 0.1 g/cc and a maximum true density of 0.14 g/cc, as measured by using a pycnometer in accordance with ASTM D2840-69. Preferred hollow glass microspheres of this disclosure may also include a mixture of hollow glass microspheres with a minimum true density of at least 0.13 g/cc and a maximum true density of 0.17 g/cc, as measured by using a pycnometer in accordance with ASTM D2840-69. Preferred hollow glass microspheres of this disclosure may also include a mixture of hollow glass microspheres with a minimum true density of at least 0.18 g/cc and a maximum true density of 0.22 g/cc, as measured by using a pycnometer in accordance with ASTM D2840-69. Preferred hollow glass microspheres of this disclosure may also include a mixture of hollow glass microspheres with a minimum true density of at least 0.23 g/cc and a maximum true density of 0.27 g/cc, as measured by using a pycnometer in accordance with ASTM D2840-69. Preferred hollow glass microspheres of this disclosure may also include a mixture of hollow glass microspheres with a minimum true density of at least 0.34 g/cc and a maximum true density of 0.40 g/cc, as measured by using a pycnometer in accordance with ASTM D2840-69. Preferred hollow glass microspheres of this disclosure may also include a mixture of hollow glass microspheres with a minimum true density of at least 0.43 g/cc and a maximum true density of 0.49 g/cc, as measured by using a pycnometer in accordance with ASTM D2840-69.

The hollow glass microspheres used in the spackling compounds of this disclosure include those which have an isostatic crush strength of at least 250 psi, at least 300 psi, at least 500 psi or at least 750 psi, as measured in the isostatic crush strength of a volume of microspheres under ASTM standard D 3102-78. According to this method, the microspheres with a volume of 3 to 6 $cm^3$ are sealed in a rubber balloon with some excess glycerin or isopropyl alcohol. The balloon is then placed into a pressure chamber filled with hydraulic oil. A pressure is applied, the changes in volume and pressure are recorded as electrical output received from sensors on an x-y recorder. See Dillinger at el. 2016 "Crush strength analysis of hollow glass microspheres," describing the method.

The most preferred hollow glass microspheres include those with a minimum true density of at least 0.1 g/cc and with a distribution of sizes, wherein the median size by volume is in the range from 40 to 70 microns.

In the present spackling compounds, the hollow glass microspheres can be used in various amounts. Some embodiments comprise the hollow glass microspheres in any amount in the range from 2% w/w to 40% w/w, from 5% w/w to 30% w/w, from 5% w/w to 20% w/w, or from 5% w/w to 15% w/w by weight of the spackling compound total, including water.

The present spackling compounds comprise one or more of rheology-modifying additives. Suitable rheology-modifying additives include rheology-modifying clays, a cellulosic thickener, an associative thickener, a non-associative synthetic thickener, an oil-based thixotrope which may be a hydrogenated castor oil (castor wax) or some other wax thixotrope derived from a modified vegetable oil, or any combination of any of these rheology-modifying additives.

Some embodiments of the present spackling compound may comprise one or more rheology-modifying clays. Such rheology-modifying clays may include one or more of the following: kaolinite (can be also referred to interchangeably as kaolin clay), attapulgite, bentonite, illite, sepiolite or any combination thereof. In some preferred embodiments, the spackling compounds of this disclosure comprise kaolinite. In some embodiments, the present spackling compounds comprise the rheology-modifying clay in an amount in the range from 0.1% w/w to 20% w/w, from 5% w/w to 20% w/w, from 5% w/w to 15% w/w, or from 5% w/w to 10% w/w by weight of the spackling compound total, including water.

Unlike conventional spackling compounds, the rheology-modifying clay may be used in substantial amounts in the present spackling compounds. Preferably, the rheology-modifying clay can be used in an amount from 5% w/w to 20% w/w, or even more preferably, in an amount from 5% w/w to 15% w/w by weight of the spackling compound total, including water.

In some preferred embodiments, the rheology-modifying clay can be used in the same amount by weight as hollow glass microspheres. In some embodiments, each of the two components can be used in any amount from 5% w/w to 20% w/w, or from 5% w/w to 15% w/w by weight of the spackling compound total, including water, e.g. each of the rheology-modifying clays and hollow glass microspheres can be used in 8% w/w, 9% w/w or 10% w/w by weight of the spackling compound total, including water.

Yet another rheology-modifying additive which can be used in the present spackling compounds is a cellulosic thickener. Suitable cellulosic thickeners comprise cellulose ethers. Suitable cellulose ethers include, but are not limited to, methyl cellulose, methyl hydroxyethyl cellulose, hydroxyethyl cellulose, hydroxypropyl methyl cellulose, hydroxypropyl cellulose, or any mixture thereof. Preferred cellulosic thickeners include hydroxyethyl cellulose, methyl hydroxyethyl cellulose or any combination thereof. The spackling compounds of this disclosure may comprise the cellulosic thickener in an amount in the range from 0.1% w/w to 5% w/w, or from 0.5% w/w to 3% w/w by weight of the spackling compound total, including water.

In some preferred embodiments, the spackling compounds comprise hydroxyethyl cellulose, methyl hydroxyethyl cellulose or any combination thereof in an amount in the range from 0.1% w/w to 5% w/w, or from 0.5% w/w to 3% w/w by weight of the spackling compound total, including water.

It has been discovered that a combination of at least one of the cellulosic thickeners with at least one of the rheology-modifying clays produces an optimized balance between good workability and low shrinkage.

In some further embodiments, the rheology-modifying clay can be omitted. Some formulations of the present spackling compound in addition to the cellulosic thickener or instead of the cellulosic thickener and/or in addition to or instead of the rheology-modifying clay, may comprise a non-ionic associative thickener, an anionic associative thickener, a non-associative synthetic thickener, an oil-based thixotrope, or any combination of any of these rheology-modifying additives.

Suitable associative thickeners include, but are not limited to, HEUR (hydrophobically modified polyurethanes), HMPE (hydrophobically modified polyethers), SMAT (styrene-maleic anhydride terpolymers), HASE (hydrophobically modified alkali swellable acrylic emulsions), HEAT (hydrophobically modified ethoxylated aminoplast polymers) and ASE (alkali swellable acrylic emulsions). The associative thickeners can be used in addition to or instead of the rheology-modifying clay. The associative thickeners can be used in any amount from 0.01% w/w to 10% w/w, and more preferably, from 0.1% w/w to 5.0% w/w by weight of the spackling compound total, including water.

The associative thickeners are particularly suitable in combination with one or more of the cellulosic thickeners. In some embodiments, spackling compounds according to this disclosure comprise one or more of the associative thickeners which can be used in an amount from 0.1% w/w to 5.0% w/w by weight of the spackling compound total, including water and one or more of the cellulosic thickeners which can be used in an amount from 0.1% w/w to 5.0% w/w by weight of the spackling compound total, including water.

Suitable non-associative synthetic thickeners are polymers which are water-soluble and are of molecular weight in the range 100,000 Da to 10,000,000 Da. These synthetic thickeners include synthetic polymers which comprise (metha)acrylic acid. These thickeners can be used in addition to or instead of the rheology-modifying clay, the cellulosic thickener and/or the associative thickener. The non-associative synthetic thickeners can be used in any amount from 0.01% w/w to 10% w/w, and more preferably, from 0.1% w/w to 5.0% w/w by weight of the spackling compound total, including water.

Oil-based thixotropes include hydrogenated vegetable oils, and in particular, hydrogenated castor oil (castor wax). These rheological additives can be used in addition to or instead of the rheology-modifying clay and/or the cellulosic thickener and/or the associative thickener. The oil-based thixotropes can be used in any suitable amount, including from 0.1% w/w to 5% w/w, or from 0.5% w/w to 3% w/w by weight of the spackling compound total.

The present spackling compounds comprise a binder. Various starches, polymeric binders, or any combination thereof can be used as a binder in the present spackling compounds.

Suitable polymeric binders include polyvinyl alcohol. Suitable polymeric binders also include, but are not limited to, an acrylic binder, a styrene-acrylic binder, a vinyl-acrylic binder, or any combination thereof. Some polymeric binders, such as polyvinyl alcohol can be used in an amount from 0.1% w/w to about 10% w/w by weight of the spackling compound total, including water.

Preferred latex polymeric binders in some embodiments include, but are not limited to, an acrylic binder, a styrene-acrylic binder, a vinyl-acrylic binder, or any combination thereof. Commercially available latex binders can be used as a solvent-based emulsion or as dry powder. The amount of the latex binder to be used in the present spackling compounds depends on whether a solvent-based emulsion or latex powder is used. Typically, the present spackling compounds may comprise from 0.5% w/w to 10% w/w of the latex binder if the latex binder is used as a powder. However, if the latex binder is supplied as an emulsion, then the amount of the emulsion can be calculated based on the percentage of latex solids in the emulsion. For example, from 1% w/w to 20% w/w of the latex binder emulsion can be used if the emulsion contains 50% of the latex solids.

Suitable starch binders may comprise one or more of the following: wheat starch, corn starch, potato starch or any mixture thereof. The starch may be pregelatinized or otherwise modified, e.g. alkylated or acid-modified.

The present spackling compounds may comprise from 0.5% w/w to 20% w/w of one or more starches by weight of the spackling compound total, including water.

Another ingredient in the present spackling compounds is a humectant. Suitable humectants include, but are not limited to, one or more polyols, including glycerol, ethylene glycol, diethylene glycol, triethylene glycol, propylene glycol, di-propylene glycol, and/or tri-propylene glycol, or any combination thereof. The preferred humectant in the present spackling compounds may include ethylene glycol and/or glycerol which can be also sourced as glycerin in the present spackling compound.

Some embodiments of the present spackling compound comprise from 0.1% w/w to 5% w/w of the humectant by weight of the spackling compound total, including water and more preferably from 1% w/w to 3 w/w by weight of the spackling compound total, including water.

Yet another necessary ingredient in the present spackling compounds is a polyacid dispersant with a molecular weight in the range from 1,000 to 75,000 Daltons, and preferably in the range from 1,500 to 20,000 Daltons. Suitable polyacid dispersants include homopolymers and/or co-polymers of acrylic, methacrylic, crotonic, and/or maleic acids. Suitable polyacrylic acid dispersants include those disclosed in U.S. Pat. No. 5,653,797.

Some embodiments of the present spackling compound comprise from 0.1% w/w to 3% w/w of the polyacid dispersant by weight of the spackling compound total, including water and more preferably from 0.1% w/w to 1 w/w by weight of the spackling compound total, including water.

The present spackling compounds may further optionally comprise at least in some embodiments, one or more of the following: a pigment, a biocide/preservative, a defoamer, a surfactant, fibers, a dryness indicator, a pH adjuster/stabilizer and/or any combination thereof.

While in some embodiments of the present spackling compound, calcium carbonate serves as a pigment, in yet other embodiments additional pigments may be also included. Such additional pigments include, but are not limited to, titanium dioxide ($TiO_2$), mica and/or carbon black. One preferred pigment in the present spackling compounds is titanium dioxide. Suitable pigments can be used in any amounts as may be needed. Typically, from 0.1% w/w to 5% w/w of the pigment by weight of the spackling compound total, including water can be used.

Suitable biocides/preservatives include various biocides/preservatives which are commercially available under the MERGAL trade name (TROY Chemical Corporation) and under the FUNGITROL trade name (International Specialty Products, New Jersey). Suitable amounts of the biocide/preservative may be in the range from 0.01% w/w to 0.3% w/w by weight of the spackling compound total, including water.

In some embodiments, the present spackling compounds have a basic pH of at least 8.0 or higher. In order to adjust and maintain a pH of the present spackling compound in the basic range, various basic compounds can be used, including, but are not limited to, sodium hydroxide, ammonia, potassium hydroxide, tri-ethylamine (TEA) or 2-amino-2-methyl-1 propanol (AMP).

Suitable dryness indicators include compounds which change their color upon evaporation of water and/or which are pH indicators. Such compounds may include phenolphthalein, thymolphthalein or other compounds, including those compounds disclosed in U.S. Pat. Nos. 2,678,280 and 6,531,528. In some embodiments, from 0.1% w/w to 5% w/w of the dryness indicator by weight of the spackling compound total, including water can be used.

Suitable surfactants include a nonionic surfactant having a hydrophilic-lipophilic balance (HLB) from about 3 to about 20, such as from about 4 to about 15, or from about 5 to about 10. Suitable non-ionic surfactants having an HLB value below about 9 include, but are not limited to, octylphenol ethoxylates and nonylphenol ethoxylates, including nonionic surfactants having HLB values below about 9 marketed under the TRITON™ and TERGITOL™ trade names (The Dow Chemical Company, Michigan). Suitable nonionic surfactants having a HLB value greater than about 11 include octylphenol ethoxylates and nonylphenol ethoxylates which have more ethylene oxide units than the nonionic surfactants having a HLB value below about 9. Useful surfactants having HLB values greater than about 11 are also marketed under the TRITON™ trade name (The Dow Chemical Company, Michigan). Other surfactants may also be used provided that the HLB value for the (blend of) surfactant(s) is as previously described for joint compound compositions in U.S. Pat. No. 8,931,230, and combinations thereof. If included, the nonionic surfactant can be present in any suitable amount, such as from 0.001% w/w to 15% w/w by weight of the spackling compound total, including water.

Suitable defoamers may include petroleum distillate. If included, the defoamer can be present in an amount from 0.01% w/w to about 10% w/w by weight of the spackling compound total, including water.

Some of the present spackling compounds can optionally comprise fibers, which are preferably synthetic fibers and may include polyethylene fibers, polyaramid fibers or any combination thereof. If fibers are included in the spackling compound, the fibers can be used in an amount from 0.1% w/w to 10% w/w by weight of the spackling compound total, including water.

In some embodiments, the present spackling compound may be formulated as shown in Table 1A below.

TABLE 1A

| Spackling Compound | |
|---|---|
| Component | Amount (% w/w) |
| Calcium Carbonate | 20-50 |
| Hollow Glass Microspheres | 2-40 |
| Rheology-Modifying Clay | 0.1-20 |
| Cellulosic Thickener | 0.1-5 |
| Associative Thicker | 0-5 |
| Non-associative Thickener | 0-10 |
| Binder | 0.5-20 |
| Humectant | 0.1-5 |
| Polyacid Dispersant | 0.1-3 |
| Pigment | 0-5 |
| Biocide/Preservative | 0-0.3 |
| Dryness Indicator | 0-5 |
| Surfactant | 0-15 |
| Defoamer | 0-10 |
| Fibers | 0-10 |
| Water | 20-50 |

As has been shown by a comparative analysis, the present spackling compounds are characterized by low shrinkage, improved sandability, a shorter drying time, and excellent workability.

Referring to FIG. 1, the present spackling compounds have low shrinkage, which in some embodiments is less than 10% or even less than 5%, as measured in according to a procedure described in Example 1. This is a significant improvement in the shrinkage rate over lightweight joint compounds which comprise perlite and which typically have a shrinkage rate higher than 10%, and also over conventional spackling compounds which comprise calcium carbonate, but do not comprise hollow glass microspheres.

Figure 2:
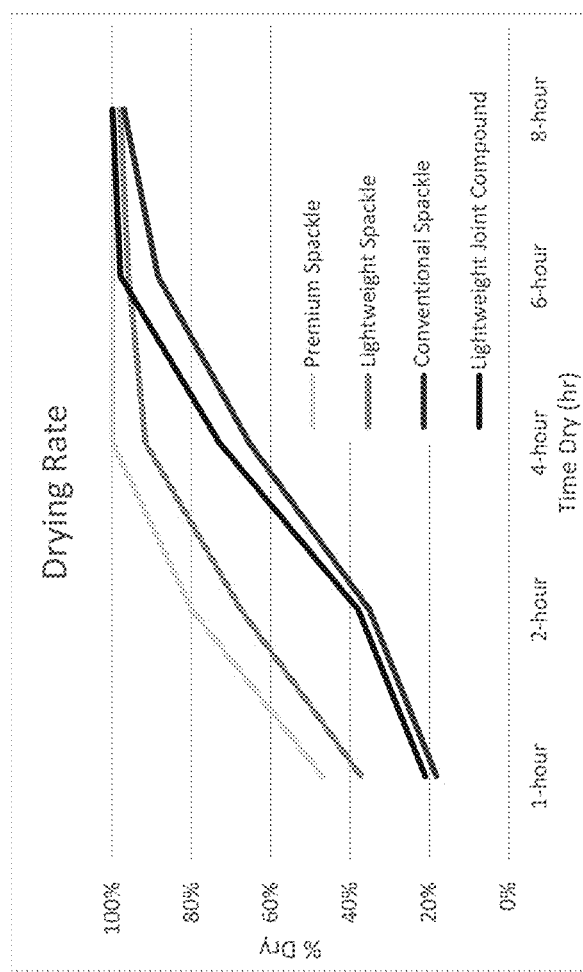
FIG. 2 reports a comparative analysis from drying time tests.

The present spackling compounds are fast drying. This allows finishing a patching project sooner. Referring to FIG. 2, the present spackling compound dries faster than a conventional spackling compound or a lightweight joint compound.

Figure 3:
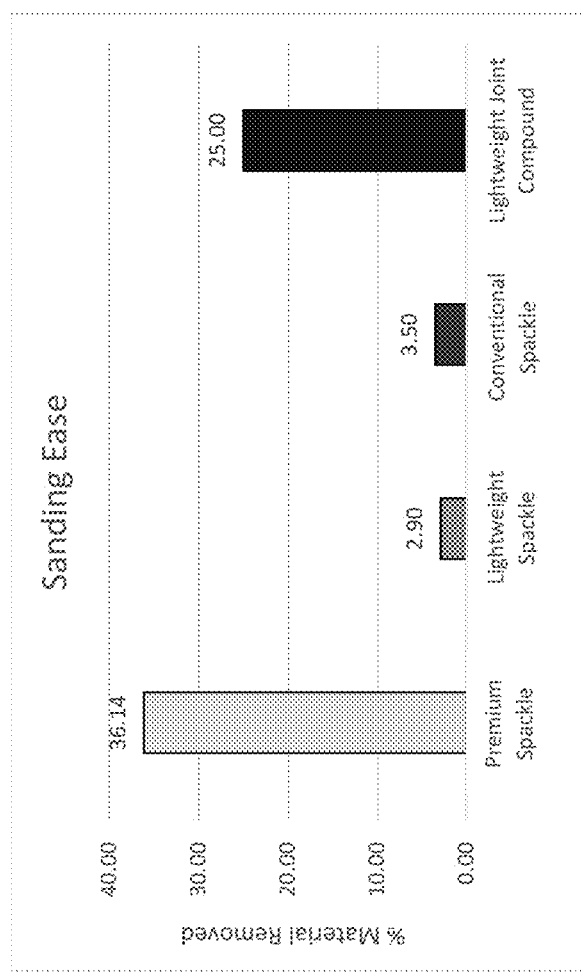
FIG. 3 reports a comparative analysis from sanding tests.

The present spackling compounds are easy to sand. Referring to FIG. 3 and unlike a lightweight spackling compound which also comprises hollow glass microspheres, the present lightweight spackling compound is easy to sand.

Figure 4:
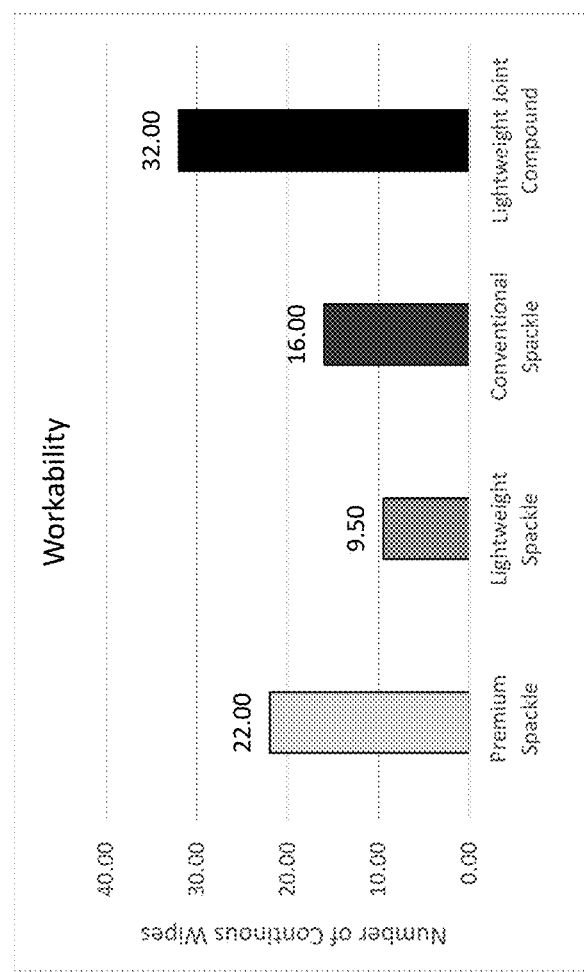
FIG. 4 reports a comparative analysis from workability test.

Even as the present spackling compounds are fast drying, these compounds also have excellent workability. Referring to FIG. 4, the number of continuous wipes for the spackling compounds according to this disclosure is comparable to the lightweight joint compound and is much higher than a number of wipes for conventional spackling compounds.

As is also shown in other tests summarized in Table 2 of FIG. 5, the present spackling compounds perform well in a paint gloss retention test.

Figure 6A:
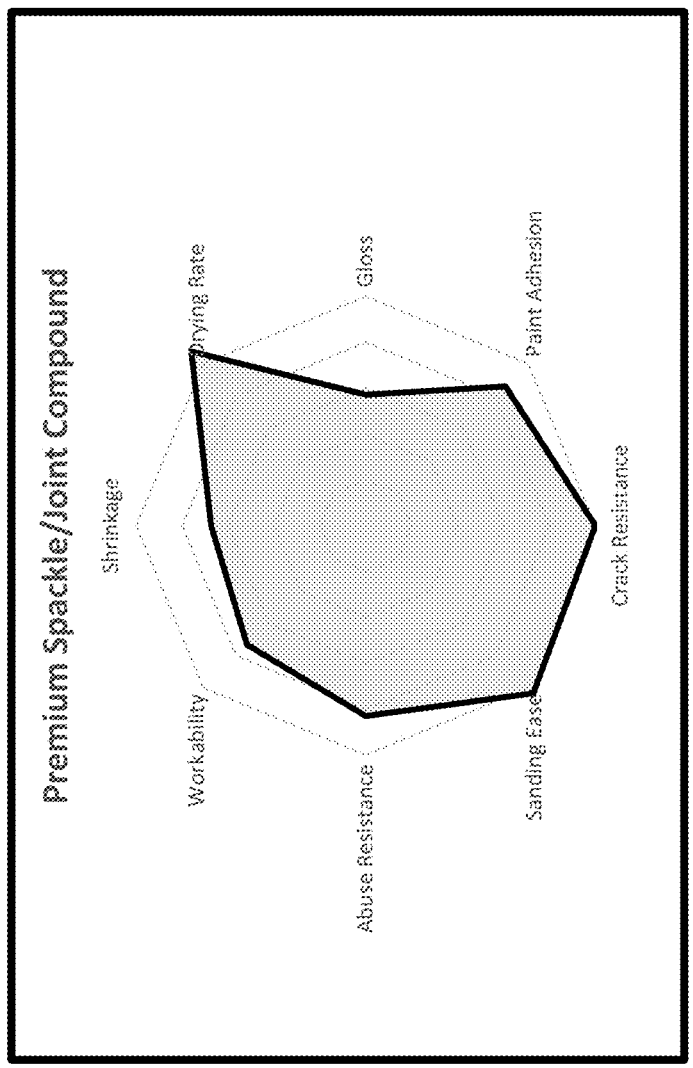
FIG. 6A depicts a summary of features for the inventive spackle/joint compound.
Figure 6B:
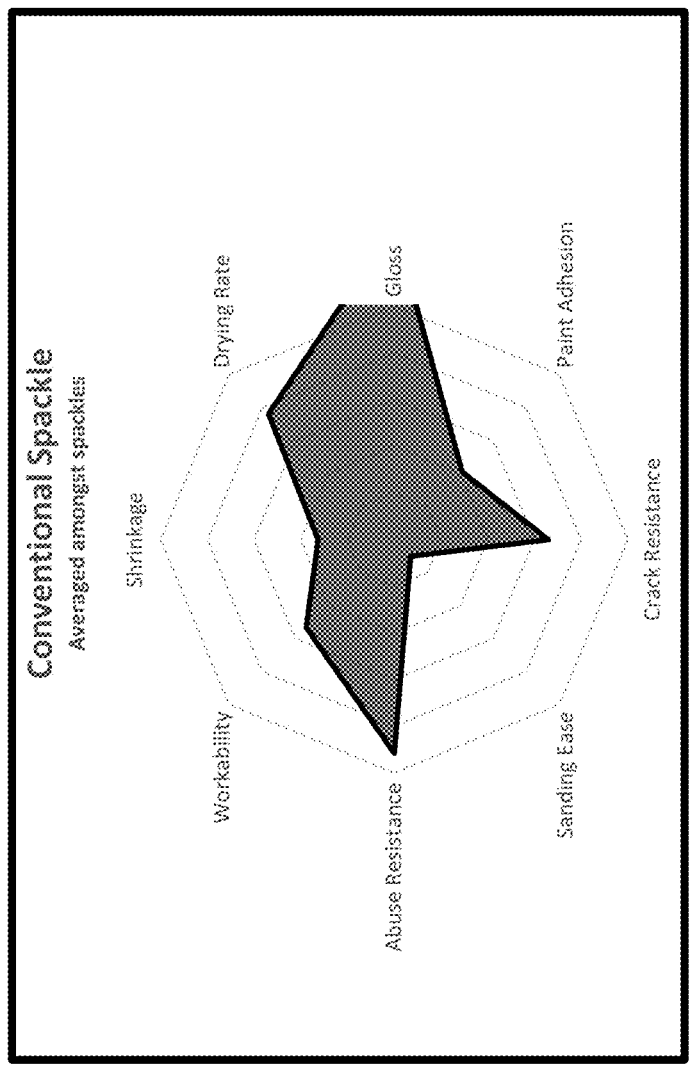
FIG. 6B depicts a summary of features for a conventional spackle.
Figure 6C:
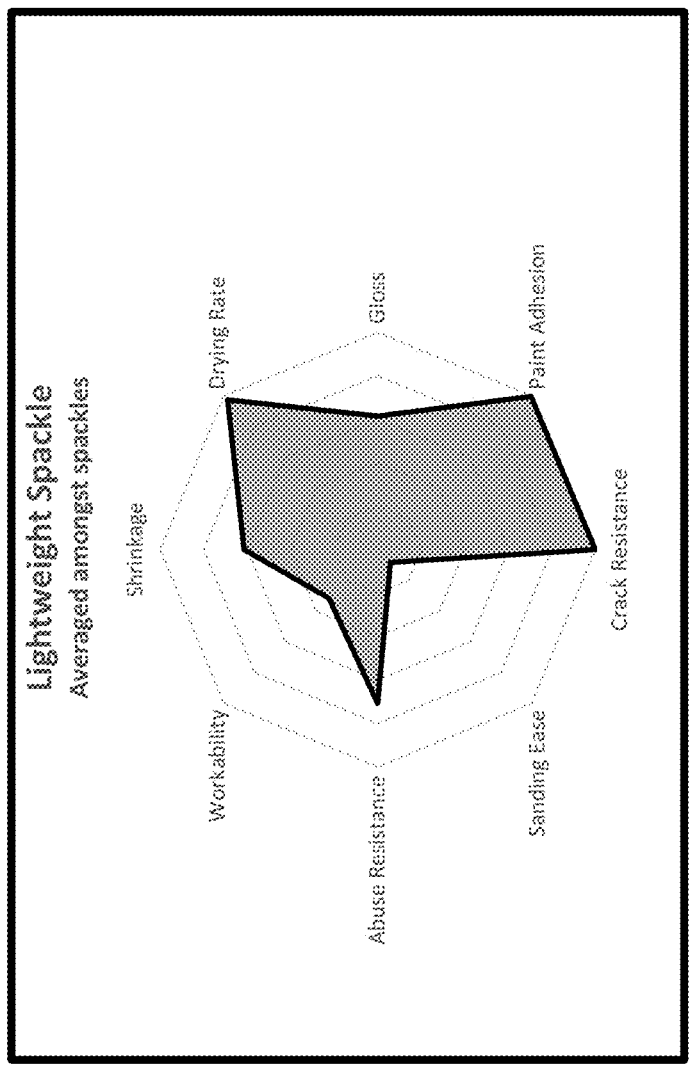
FIG. 6C depicts a summary of features for a conventional lightweight spackle.
Figure 6D:
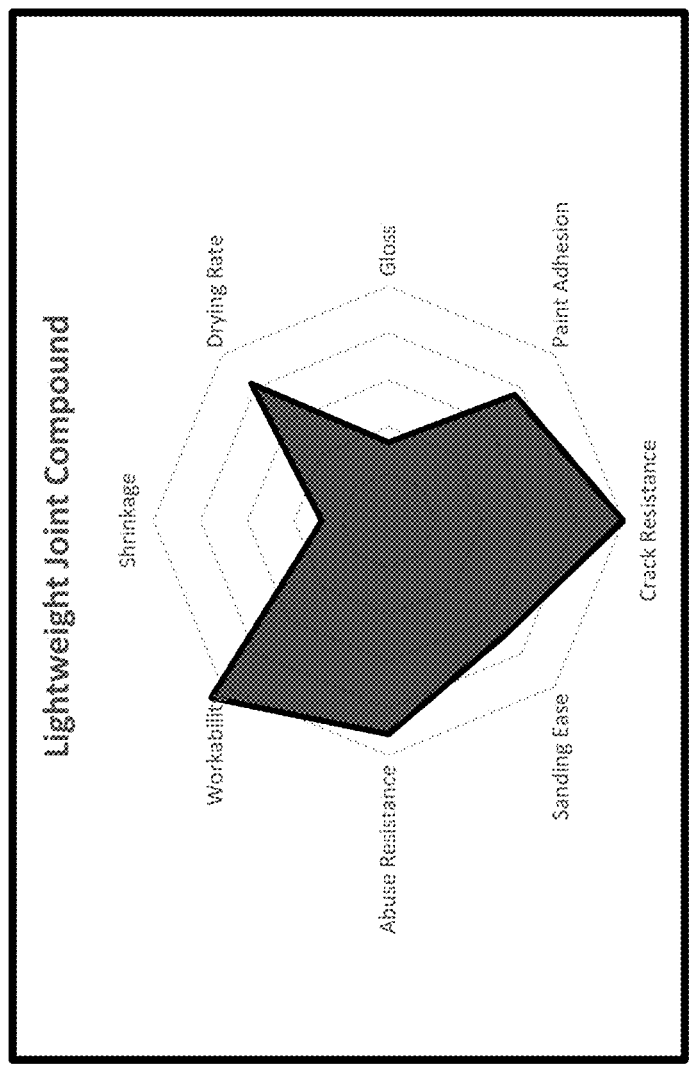
FIG. 6D depicts a summary of features for conventional lightweight joint compound.

As can be seen by comparing FIG. 6A to control compounds of FIGS. 6B, 6C and 6D, the present spackling compound according to this disclosure has a cumulative improvement in a set of features, including workability, shrinkage, drying rate, gloss retention, paint adhesion, crack resistance, sanding ease and abuse resistance.

In the further embodiments, the present disclosure provides methods in which the present spackling compounds can be used for various wall repair projects, including patch repairs of interior walls and ceiling. Such repairs may include patching cracks, holes and/or indentations. The present spackling compound can be applied over a variety of different substrates, including, but are not limited, to wallboard, plaster, cementitious substrate and/or wood. After the spackling compound has dried, it can be lightly sanded. Because the present spackling compound has low shrinkage, the spackling compound may need to be applied only once in order to patch a wall defect. However, in some other embodiments, several coats of the spackling compound can be also applied.

The patched surface may then be coated with a primer and/or painted. Various methods can be used for applying the present spackling compound to the surface. Because the spackling compound is applied after it has been mixed with water and it is a paste, the spackling compound can be applied with a spackling knife or by any other tool with which some of the spackling compound paste is scooped from a container and applied over the damaged area, e.g. a crack or hole.

In a further aspect, the present spackling compounds can be also used as a joint compound. The present spackling compounds can be used in all applications, including for embedding joint tape into a joint, filling a joint and top coating the joint between adjacent wallboards during wall construction. The spackling compound is compatible with a conventional joint compound, such as for example as all purpose joint compound. The spackling compound can be used as a top-coat over a conventional joint compound.

The following examples further illustrate the present spackling compound and its technical advantages in comparison to conventional spackling compounds Example 1

One embodiment of the spackling compound accordingly to this disclosure was prepared by mixing together ingredients listed in Table 1 below.

TABLE 1

Premium Spackle

| Ingredient | Weight (g) | % |
|---|---|---|
| Calcium Carbonate | 281 | 35% |
| Glass Microsphere | 62 | 8% |
| Kaolin Clay | 62 | 8% |
| Pigment (TiO$_2$) | 16 | 2% |
| Cellulosic Thickener (hydroxyethylcellulose) | 7 | 0.9% |
| Latex acrylic binder comprising 50% of latex solids | 56 | 7% |
| Humectant (Glycerin or Ethylene Glycol) | 9 | 1% |
| Polyacid Dispersant | 4 | 0.5% |
| Preservative (Hexahydro-1,3,5,-tris(2-hydroxyethyl)-s-triazine) | 1 | 0.2% |
| Water | 300 | 38% |

The spackling compound which is prepared by mixing the ingredients listed in Table 1 is referred in this disclosure as "the premium spackling compound or interchangeably as the premium spackle." The premium spackling compound of this disclosure was compared to commercially available spackles: a) a conventional spackling compound which comprises calcium carbonate, but does not comprise hollow glass microspheres, hereafter referred to as "the conventional spackle"; b) a lightweight conventional spackling compound which comprises hollow glass microspheres, hereafter referred to as "the lightweight spackle"; and c) a lightweight joint compound which comprises calcium carbonate and perlite, but does not comprise hollow glass microspheres, hereafter referred to as "the light weight joint compound."

The following tests were conducted as a comparative analysis for the premium spackling compound in comparison to the conventional spackle, the lightweight spackle and the light-weight joint compound.

Shrinkage. A spackle/compound was applied over a 200-mil thickness template and each sample was placed in a stable environmental chamber or room. Samples were allowed to fully dry over 24-hours. Once a sample was fully dried, the thickness of the dried sample was measured. A percent shrinkage from initial wet thickness was then recorded. Results from these tests are reported in FIG. 1. As can be seen in FIG. 1, the premium spackle has shrinkage of less than 10%, which is a significant improvement over the conventional spackle and the lightweight joint compound.

Drying Rate. A spackle/compound was applied over a 50-mil thickness template and each sample was placed in a stable environmental chamber or room. A weight loss of a sample was measured over time to determine when the sample is 100% dry, which was recorded as the time at which all moisture has evaporated from the sample and no more weight loss was detected.

Results from these tests are reported in FIG. 2. As can be seen in FIG. 2, the premium spackling compound is fast drying and dries quicker than the conventional spackling compound or the lightweight joint compound.

Sanding Ease. A spackle/compound was applied over a 50-mil thickness template and each sample was placed in a stable environmental chamber or room. Once a sample was dried, its weight was measured. Each sample was placed on Gardner Abrasion tester with 150-grit sandpaper for 5 oscillating strokes. Each sample was weighed post sanding and a percentage of removed material was recorded. The results of this test are reported in FIG. 3, which shows that the premium spackling compound is easier to sand in comparison to the lightweight spackle and also in comparison to the conventional spackle.

Workability. 5-mils of a spackle/compound was continuously wiped over a clean wallboard sample until the material was no longer considered workable, i.e. the material was too dry to continue wiping or the material would no longer stick to the application knife. The results of this test are reported in FIG. 4. As can be seen in FIG. 4, the premium spackling compound is highly workable and tolerates up to 22 continuous wipes in comparison to the lightweight spackle which was suitable for fewer than 10 wipes.

Paint Gloss. Using a draw down bar, paint was applied over a spackle/compound at a thickness of 5-mils. Paint was allowed to dry for 24 hours. The gloss value was measured using a BYK Gardner micro-TRI-gloss p meter and compared to a control wallboard sample that was painted without spackle/compound applied. The value closest to the painted wallboard sample received the highest performance for gloss since a user would like a repair patch that does not flash once painted. These results are reported in Table 2 of FIG. 5.

Density for each sample was measured by filling a container of known volume and calculating the density based on the known density of water. The equation is Density=(weight of compound in cup/weight of water in cup)*8.345. Units are in lbs/gal. These density measurements are reported in Table 2 of FIG. 5.

Paint Adhesion was measured according to the modified ASTM D3359-09 Standard Test Method for Measuring Adhesion by Tape Test. Using a draw down bar, paint was applied over a spackle/compound at a thickness of 5-mils. Paint was allowed to dry for 24 hours. Each sample was scoured in a cross-hatch pattern to promote paint adhesion failure. A strong adhesive masking tape was applied over the painted sample using a 5-pound weighted roller for consistent application. The masking tape was then pulled off at a perpendicular angle and the percent of paint still adhered to the sample was the area calculated for percent paint adhesion. These results are reported in FIG. 6A through FIG. 6D.

Crack Resistance. A spackle/compound was applied at a tapered angle (125-mil thickness to 0-mils thickness). Samples were dried in a hot/dry condition under a fan in order to promote extreme cracking conditions. Samples were then evaluated by measuring the total length of cracking that occurs in the sample. These results are reported in FIG. 6A through FIG. 6D.

Measuring Hardness of Spackle/Compound (Resistance to Damage). A spackle/compound sample was applied at 200-mils thick and allowed 24-hours to thoroughly dry. Once dried, the sample's hardness was evaluated using a durometer from Pacific Transducer Corp. (PTC™ Instruments), model 414. Other durometers can be also used. The softer the sample is, the lower the resistance of the sample is to damage. These results are reported in FIG. 6A through FIG. 6D.

Referring to Table 2 in FIG. 5, it provides a further comparative analysis of the premium spackling compound to the lightweight spackle, the conventional spackle, the the lightweight joint compound and a drying-type joint compound comprising hollow glass microspheres, referred to as "the fast finish compound."

FIG. 6A reports a combined set of features for the premium spackle in comparison to the conventional spackle (FIG. 6B), the lightweight spackle (FIG. 6C) and the lightweight joint compound (FIG. 6D).

For tests reported in FIGS. 6A-6D, shrinkage was measured as in connection with FIG. 1, a drying rate was measured as in connection with FIG. 2, gloss was measured as in connection with FIG. 5.

What is claimed is:

1. A spackling compound which comprises:
   20-50% w/w calcium carbonate by total weight of the spackling compound,
   5-20% w/w hollow glass microspheres by total weight of the spackling compound,
   0.5-10% w/w of a binder by total weight of the spackling compound,
   0.1-5% w/w of a humectant by total weight of the spackling compound,
   0.1-3% w/w of a polyacid dispersant by total weight of the spackling compound, wherein the polyacid dispersant is a homopolymer or co-polymer of acrylic, methacrylic, crotonic and/or maleic acids and has a molecular weight in the range from 1,500 to 20,000 Daltons, and
   a rheology-modifying additive, and wherein the rheology-modifying additive includes 0.1-5% w/w of a cellulosic thickener and 8-20% w/w of a rheology-modifying clay by total weight of the spackling compound; and
   wherein when mixed with water, the spackling compound comprises water in an amount from 20% w/w to 50% w/w by total weight of the spackling compound.

2. The spackling compound of claim 1, wherein the rheology-modifying additive further comprises one or more of the following: an associative thickener, a non-associative synthetic thickener, an oil-based thixotrope, or any combination thereof.

3. The spackling compound of claim 1, wherein the spackling compound is a ready-mixed paste.

4. The spackling compound of claim 1, wherein the hollow glass microspheres are a mixture of particles with a particle size distribution with a particle median size by volume in the range from 40 to 70 microns.

5. The spackling compound of claim 1, wherein the hollow glass microspheres are a mixture of particles having a minimum true density of at least 0.1 g/cc.

6. The spackling compound of claim 1, wherein the spackling compound comprises one or more of the following rheology-modifying clays: kaolinite, attapulgite, bentonite, illite, sepiolite or any combination thereof.

7. The spackling compound of claim 1, wherein the cellulosic thickener which comprises one or more of the following: methyl cellulose, methyl hydroxyethyl cellulose, hydroxyethyl cellulose, hydroxypropyl methyl cellulose, hydroxypropyl cellulose, or any mixture thereof.

8. The spackling compound of claim 1, wherein the spackling compound comprises the cellulosic thickener in an amount in the range from 0.1% w/w to 5% w/w by total weight of the spackling compound, including water.

9. The spackling compound of claim 1, wherein the spackling compound further comprises one or more of the following compounds: a hydrophobically modified polyurethane (HEUR), a hydrophobically modified polyether (HMPE), a styrene-maleic anhydride terpolymer (SMAT), a hydrophobically modified alkali swellable acrylic emulsion (HASE), hydrophobically modified ethoxylated aminoplast polymer (HEAT), an alkali swellable acrylic emulsion (ASE), an oil-based thixotrope, or any combination thereof.

10. The spackling compound of claim 1, wherein the spackling compound comprises one or more of the following binders: starch, polyvinyl alcohol, acrylic binder, styrene-acrylic binder, vinyl acrylic binder, or any combination thereof.

11. The spackling compound of claim 1, wherein the spackling compound is further characterized by one or more of the following features:
    a) the humectant comprises one or more of the following: glycerol, ethylene glycol, diethylene glycol, triethylene glycol, propylene glycol, di-propylene glycol, and/or tri-propylene glycol, or any combination thereof; and
    b) the spackling compound further comprises one or more of the following: a pigment, a biocide/preservative, a defoamer, a surfactant, fibers, a dryness indicator, a pH adjuster/stabilizer, and/or any combination thereof.

12. The spackling compound of claim 1, wherein the rheology-modifying clay is used in the same amount as hollow glass microspheres.

13. A method for patching a surface, the method comprising applying to the surface the spackling compound of claim 1.

14. The method of claim 13, wherein the surface is wallboard, plaster, cementitious surface and/or wood.

15. The method of claim 13, wherein method further comprises sanding, coating with a primer and/or painting the patched surface.

16. A method for finishing a joint between two adjacent panels, the method comprising filling the joint with the spackling compound of claim 1 and/or applying the spackling compound of claim 1 as a top-coat.

* * * * *